Patented July 21, 1942

2,290,165

UNITED STATES PATENT OFFICE 2,290,165

METHOD OF DEHYDRATING CASTOR OIL

Oscar A. Cherry, Chicago, Ill., assignor to The Glidden Company, Cleveland, Ohio, a corporation of Ohio No Drawing. Application July 11, 1938,
Serial No. 218,640

10 Claims. (Cl. 260—398)

The present invention relates to the treatment of castor oil and more particularly to the preparation of a drying oil from castor oil.

It is known to dehydrate castor oil by heating with sulfuric acid under reduced pressure. However, satisfactory dehydration does not take place at ordinary atmospheric pressures so that the treatment cannot be carried out in ordinary open kettles. Furthermore, in the preparation of varnishes from drying oils it is customary in almost all cases to heat the oil at elevated temperatures to cause progressive increase in viscosity. It has been found that an oil obtained by dehydrating castor oil in the presence of sulfuric acid under reduced pressure suffers some decomposition or other change when so heated that results in a decided increase in acid and acetyl values. This increase in acid number causes the oil to react disadvantageously with reactive pigments such as zinc oxide, etc.

Some dehydration of castor oil at atmospheric pressure may also be obtained by heating at atmospheric pressure in the presence of zinc salts such as zinc chloride. The oil so obtained is characterized by high acid and acetyl values. Lead ricinoleate will react catalytically in a similar manner with the characteristic high acid and acetyl values for the resulting oil.

According to the present invention a new process is provided for preparing a drying oil from castor oil. The invention contemplates the use of a new material for catalytically dehydrating castor oil, as well as the procedure involved. According to the invention, castor oil is dehydrated at atmospheric pressure, and the oil produced is of low acid and acetyl values, which values do not increase upon subsequent heating at elevated temperatures in the manufacture of varnishes, etc. On the contrary, acid and acetyl values of the oil prepared according to the preferred embodiment of the invention decrease upon heating at elevated temperatures. The invention also contemplates the oil prepared according to the method of the present invention. Reduced pressures may be used, however, if it is desired to do so.

It has been found that if castor oil is heated with china clay that the desirable results are attained.

As little dehydration occurs below a temperature of 450° F. it is preferable to carry out the dehydration at a temperature of approximately 450° F. or above, best results being obtained when the dehydration is carried out at approximately 500° F. If the temperature is raised much above 500° F. before a substantial amount of dehydration has taken place, side reactions occur which result in the oil having higher acid and acetyl values than when the dehydration is carried out below approximately 500° F. On the other hand the oil obtained by catalytic dehydration of castor oil in the presence of chaina clay decreases in acid and acetyl values somewhat when the oil is heated at temperatures above 500° F., provided the dehydration has been satisfactory before raising the temperature above 500° F. Agitation is useful to prevent settling of the clay.

Example I 1,037 grams of castor oil, having an acetyl value of 175.2 was heated in a distilling apparatus with 50 grams of china clay while agitating mechanically and passing carbon dioxide through the oil to assist in the removal of water as formed. A temperature of 270° C. was obtained in about one hour, and water began to be evolved at 225° C. The temperature was held at 270° C. plus or minus 10° for one hour. The loss in weight was 60 grams. The oil so obtained was quite viscous, had an acid number of 11.0 and an acetyl value of 31.35.

Example II 5,000 grams of castor oil were heated with 250 grams of china clay in an aluminum varnish kettle to 282° C. quickly, while agitating mechanically, and held at that temperature for one hour. The resultant oil had an acid number of 13.4 and an acetyl value of 33.97.

An approximately 50 gallon long batch of limed rosin varnish was made from this oil by cooking the limed rosin with the oil at 560° F. until the proper body was obtained, and then thinning with oleum spirits. Upon the addition of driers the varnish could be baked at 225° F. to give a film substantially as hard as a film from a similar wood oil varnish.

Example III 1,500 grams of castor oil was heated with 15 grams china clay in a glass vessel equipped with a condenser and receiver for collecting the effluent vapors. The mixture was stirred mechanically and carbon dioxide was passed through the oil to assist in the removal of the water as formed and to provide an inert atmosphere to prevent oxidation of the drying oil formed as a result of the treatment. The following table shows the temperatures and the amount of distillate collected at the various stages of the heat treatment.

| Time | Temperature °C. | Aqueous distillate Cc. | Non aqueous distillate Cc. |
|---|---|---|---|
| 25 min | 210 | 1.0 | 0.0 |
| 49 min | 235 | 2.5 | 0.0 |
| 58 min | 245 | 7.5 | 0.0 |
| 1 hr., 08 min | 247 | 15.0 | 0.0 |
| 1 hr., 19 min | 249 | 24.0 | 0.0 |
| 1 hr., 31 min | 243 | 33.0 | 1.0 |
| 1 hr. 38 min | 243 | 36.0 | 1.0 |
| 1 hr. 48 min | 249 | 40.0 | 1.5 |
| 1 hr. 58 min | 248 | 43.5 | 1.5 |
| 2 hrs. 10 min | 256 | 48.0 | 1.5 |
| 2 hrs. 30 min | 256 | 50.0 | 1.5 |
| 2 hrs. 50 min | 264 | 53.0 | 1.5 |
| 3 hrs. 09 min | 272 | 56.0 | 2.0 |
| 3 hrs. 29 min | 280 | 57.5 | 2.0 |
| 3 hrs. 48 min | 288 | 59.5 | 2.0 |
| 4 hrs. 59 min | 281 | 63.0 | 6.0 |

The acid number of this oil after centrifuging to remove a part of the clay was 16.3 and the acetyl value was 35.26.

This oil was subsequently heated one hour at 293° C. to increase the viscosity. The acid number fell to 13.7 and the acetyl value to 30.74.

*Example IV*

In this example 2,505 grams of castor oil was heated with 25 grams of china clay under reduced pressure. The mixture was first heated to 250° F. and then a vacuum of 27 inches of mercury was applied. A temperature of 480° F. was reached in one hour and twenty minutes and was held for two and three-quarter hours. The temperature was then raised to 500° F. and held for two hours. The resulting oil had an acid number of 11.1 and an acetyl value of 45.3.

*Example V*

1,510 grams of castor oil was heated with 10 grams of china clay while agitating mechanically and passing carbon dioxide through the oil. The temperature was quickly raised to 250° C. and held for two and one-half hours at 250°–270° C. The loss in weight was 70 grams. This oil had an acid number of 9.7 and an acetyl value of 49.8.

This oil was tested in a varnish as a substitute for china wood oil and found satisfactory since it baked to a very hard film, quite resistant to hot water.

*Example VI*

Fifteen pounds of castor oil was heated to 500° F. during one hour with 0.3 pound of china clay. Mechanical agitation was resorted to until the temperature reached 500° F. when the escape of water was sufficiently vigorous to render additional agitation unnecessary. The temperature was then raised to 560° F. in one hour. This oil when made into a varnish, dried well upon the addition of driers. Baked films of excellent quality were obtained.

The above examples are to be considered exemplary of the invention. The broader phase of the invention is believed to reside in the heating of castor oil with china clay to effect dehydration of the oil. Preferably substantial dehydration is carried out between 450° and 500° F. more or less, with a temperature of approximately not more than 500° F. being preferred. Advantageous results may be obtained by heating above 500° F. after substantial dehydration below that temperature.

In general the preferred drying oils produced from castor oil by the present process have acid numbers below 20 and acetyl values below 50. However, it is not necessary that the heating and dehydration be carried out to a degree which results in acid and acetyl values below these figures. The process is such, however, that drying oils of low acid number and acetyl values can be produced from castor oil and this is one of the significant phases of the present invention.

China clay is hydrated aluminum silicate, and such material is the equivalent of china clay, whether so designated or not, or a material containing the same in amounts sufficient to have a dehydrating action on the castor oil.

What I claim is:

1. The process of dehydrating castor oil which comprises heating the same at dehydrating temperatures in the presence of china clay as a dehydration catalyst.

2. The process of dehydrating castor oil which comprises heating the same at dehydrating temperatures to a temperature above 450° F. in the presence of china clay as a dehydration catalyst.

3. The process of dehydrating castor oil which comprises heating the oil at a temperature between 450° F. and 500° F. in the presence of china clay as a dehydration catalyst.

4. The process of dehydrating castor oil which comprises heating the oil at a temperature of approximately 500° F. in the presence of china clay as a dehydration catalyst.

5. The process which comprises heating castor oil at a temperature not exceeding substantially 500° F. in the presence of china clay as a dehydration catalyst to effect substantial dehydration of the oil, and then heating the oil above 500° F.

6. The process which comprises heating castor oil with china clay as a dehydrating catalyst to a temperature of approximately 450 to 500° F. to effect substantial dehydration of the oil, and then heating the oil above 500° F.

7. The process which comprises heating castor oil with china clay as a dehydrating catalyst to a temperature of approximately 500° F. to effect substantial dehydration of the oil and then heating the oil above 500° F.

8. The process of dehydrating castor oil which comprises heating the same at dehydrating temperatures, at atmospheric pressure, in the presence of china clay as a dehydration catalyst.

9. The process of dehydrating castor oil which comprises heating and agitating the same at dehydrating temperatures with china clay as a dehydration catalyst.

10. The process of dehydrating castor oil which comprises heating and agitating the same at dehydrating temperatures, at atmospheric pressure, with china clay as a dehydration catalyst.

OSCAR A. CHERRY.